US010023758B2

(12) United States Patent
Nicolas (10) Patent No.: US 10,023,758 B2
(45) Date of Patent: Jul. 17, 2018

(54) PHOTO-ACTIVATED HYDROPHILIC COATINGS AND METHODS FOR THEIR PREPARATION AND USE

(71) Applicant: EMPIRE TECHNOLOGY DEVELOPMENT LLC, Wilmington, DE (US)

(72) Inventor: Buker Nicolas, Seattle, WA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 370 days.

(21) Appl. No.: 14/906,540

(22) PCT Filed: Jul. 23, 2013

(86) PCT No.: PCT/US2013/051598
§ 371 (c)(1),
(2) Date: Jan. 20, 2016

(87) PCT Pub. No.: WO2015/012804
PCT Pub. Date: Jan. 29, 2015

(65) Prior Publication Data
US 2016/0160072 A1 Jun. 9, 2016

(51) Int. Cl.
| | | |
|---|---|---|
| B32B 7/04 | (2006.01) | |
| C09D 133/02 | (2006.01) | |
| C09D 7/00 | (2018.01) | |
| C08K 3/20 | (2006.01) | |
| C09D 7/20 | (2018.01) | |
| C09D 7/61 | (2018.01) | |
| C09D 157/12 | (2006.01) | |
| C09D 137/00 | (2006.01) | |
| B05D 3/06 | (2006.01) | |
| C09D 7/12 | (2006.01) | |
| C09D 133/14 | (2006.01) | |
| C09D 139/00 | (2006.01) | |
| C08K 3/22 | (2006.01) | |
| C08K 5/05 | (2006.01) | |

(52) U.S. Cl.
CPC ........... *C09D 133/02* (2013.01); *B05D 3/065* (2013.01); *C09D 7/001* (2013.01); *C09D 7/1216* (2013.01); *C09D 7/20* (2018.01); *C09D 7/61* (2018.01); *C09D 133/14* (2013.01); *C09D 137/00* (2013.01); *C09D 139/00* (2013.01); *C09D 157/12* (2013.01); *C08K 5/05* (2013.01); *C08K 2003/2241* (2013.01)

(58) Field of Classification Search
USPC .................. 428/420; 427/508, 518; 524/430; 522/66
See application file for complete search history.

(56) References Cited

U.S. PATENT DOCUMENTS

| | | | | |
|---|---|---|---|---|
| 3,799,915 | A * | 3/1974 | Dunnavant et al. | .. C07C 51/353 430/287.1 |
| 6,054,277 | A | 4/2000 | Furcht et al. | |
| 6,770,441 | B2 | 8/2004 | Dickinson et al. | |
| 7,150,856 | B2 * | 12/2006 | Jan ....................... | B01J 19/0046 422/425 |
| 7,846,201 | B2 * | 12/2010 | Chorny ................ | A61K 9/5146 424/646 |
| 2004/0009424 | A1 * | 1/2004 | Fedynyshyn ......... | G03F 7/0046 430/270.1 |
| 2005/0164258 | A1 * | 7/2005 | Goldberg ............. | B01J 19/0046 506/16 |
| 2006/0134672 | A1 | 6/2006 | Chang et al. | |
| 2006/0189716 | A1 | 8/2006 | Ushirogouchi et al. | |
| 2007/0104922 | A1 | 5/2007 | Zhai et al. | |
| 2009/0120325 | A1 | 5/2009 | Kyota et al. | |
| 2009/0275906 | A1 * | 11/2009 | Berland ................ | A61L 15/225 604/359 |
| 2010/0081215 | A1 | 4/2010 | De Geest et al. | |
| 2010/0198168 | A1 | 8/2010 | Rooijmans | |
| 2010/0304150 | A1 | 12/2010 | Zheng et al. | |
| 2011/0076450 | A1 | 3/2011 | Sharma | |
| 2012/0115089 | A1 | 5/2012 | Ishizuka et al. | |

OTHER PUBLICATIONS

International Search Report and Written Opinion from International Application No. PCT/US2013/051598 dated Dec. 11, 2013.
"Salt bridge (protein and supramolecular)," Wikipedia, the free encyclopedia, accessed at http://web.archive.org/web/20130514112634/http://en.wikipedia.org/wiki/Salt_bridge_(protein_and_supramolecular), last modified on Apr. 19, 2013, pp. 5.
Diby, A.K., et al., "Kinetic study of negative dry-film photoresists," eXPRESS Polymer Letters, vol. 1, No. 10, pp. 673-680 (2007).
Givens, R.S., et al., "Photoremovable Protecting Groups," CRC Handbook of Organic Photochemistry and Photobiology, 2nd Edition, pp. 69-1-69-46 (Oct. 13, 2013).
Rånby, B., "Photochemical modification of polymers—photocrosslinking, surface photografting, and lamination," Polymer Engineering & Science, vol. 38, Issue 8, pp. 1229-1243 (Aug. 1998).

(Continued)

*Primary Examiner* — Tae H Yoon (57) ABSTRACT

Disclosed herein are coating compositions and methods of making and using the same. The coating composition includes a first polymer having at least one positively charged group; a second polymer having at least one negatively charged group; and at least one protecting group contacting the positively charged group of the first polymer, the negatively charged group of the second polymer, or both. The protecting group is configured to be removed by photocleavage to form a salt bridge between the positively and negatively charged groups. The coating composition may be hydrophilic when the salt bridge is formed.

29 Claims, 4 Drawing Sheets

(56) References Cited

OTHER PUBLICATIONS

Yao, D., et al., "Photoinitiated crosslinking of ethylene-vinyl acetate copolymers and characterization of related properties," Polymer Engineering & Science, vol. 47, Issue 11, pp. 1761-1767 (Nov. 2007).

\* cited by examiner

PHOTO-ACTIVATED HYDROPHILIC COATINGS AND METHODS FOR THEIR PREPARATION AND USE

CROSS-REFERENCE TO RELATED APPLICATION

This application is a U.S. national stage filing under 35 U.S.C. § 371 of PCT International Application No. PCT/US2013/051598 filed on Jul. 23, 2013.

FIELD

The present disclosure relates to coating compositions and methods of preparing and using the same.

BACKGROUND

When water dries from a surface, water marks, smears or spots are left on the surface due to the debris present in the water. One strategy for producing a self-cleaning surface is to use hydrophilic materials. The hydrophobic debris is often repelled from this type of surface, and the hydrophilic debris is attracted by water. As water droplets spread out across the surface, they carry away the debris and clean the surface without the need for scrubbing or the use of harsh chemicals. Particularly in exterior applications, water can come in the form of rain making these surfaces essentially self-cleaning. Therefore, self-cleaning surfaces using hydrophilic materials have been of significant industrial interest.

SUMMARY

Some embodiments disclosed herein provide a coating composition. The coating composition includes a first polymer including at least one positively charged group; a second polymer including at least one negatively charged group; and at least one protecting group contacting the positively charged group of the first polymer, the negatively charged group of the second polymer, or both, wherein the at least one protecting group is configured to be removed by photocleavage to form a salt bridge between the positively and negatively charged groups.

Some embodiments disclosed herein provide a coating composition including at least one self-cleaning mineral; and a medium for dispersing the at least one self-cleaning mineral, wherein the medium includes a first polymer including at least one positively charged group, a second polymer including at least one negatively charged group, and at least one protecting group contacting the positively charged group of the first polymer, the negatively charged group of the second polymer, or both, wherein the at least one protecting group is configured to be removed by photocleavage to form a salt bridge between the positively and negatively charged groups.

Some embodiments disclosed herein provide a method of making a coating composition, the method including providing a mixture including a first polymer that includes at least one positively charged group, a second polymer that includes at least one negatively charged group, and at least one protecting group contacting the positively charged group of the first polymer, the negatively charged group of the second polymer, or both, wherein the at least one protecting group is configured to be removed by photocleavage to form a salt bridge between the positively and negatively charged groups.

Some embodiments described herein provide a method of making a storage-stable coating composition, the method including providing a mixture including a first polymer that includes at least one positively charged group, a second polymer that includes at least one negatively charged group, and at least one protecting group contacting the positively charged group of the first polymer, the negatively charged group of the second polymer, or both, wherein the at least one protecting group is configured to be removed by photocleavage to form a salt bridge between the positively and negatively charged groups; and shielding the mixture from radiation in a visible or ultraviolet range.

Some embodiments described herein provide a method of coating a substrate, the method including applying a coating composition to the substrate, wherein the coating composition includes a first polymer that includes at least one positively charged group, a second polymer that includes at least one negatively charged group, and at least one protecting group contacting the positively charged group of the first polymer, the negatively charged group of the second polymer, or both; wherein the at least one protecting group is configured to be removed by photocleavage to form a salt bridge between the positively and negatively charged groups.

Some embodiments disclosed herein provide an article of manufacture including a coating covering at least a portion of the article, wherein the coating includes a first polymer including at least one positively charged group, a second polymer including at least one negatively charged group, and at least one protecting group contacting the positively charged group of the first polymer, the negatively charged group of the second polymer, or both; wherein the at least one protecting group is configured to be removed by photocleavage to form a salt bridge between the positively and negatively charged groups.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Definitions

Unless defined otherwise, all technical and scientific terms used herein have the same meaning as is commonly understood by one of ordinary skill in the art. In the event that there is a plurality of definitions for a term, those in this section prevail unless stated otherwise.

As used herein, the term "positively charged group" refers to any functional group that carries a positive charge at a neutral pH. Examples of "positively charged group" include but are not limited to carboxylic acid, sulfonic acid, phosphoric acid, phosphonic acid, boric acid, and other suitable acid groups.

As used herein, the term "negatively charged group" refers to any functional group that carries a negative charge at a neutral pH. Examples of "negatively charged group" include but are not limited to amine group, ammonium group and other base groups.

As used herein, the term "additive" refers to a solid or liquid component admixed with a coating composition for the purpose of affecting one or more properties of a cured coating composition. An additive can be a component, agent, composition and the like usually added in smaller amounts (e.g. less than 5%, 1%, 0.1%, or 0.01% (vol./vol.)) and yet give a significant effect on the product. Additives can include one or more of catalysts, thickeners, stabilizers, emulsifiers, texturizers, adhesion promoters, UV stabilizers, flatteners (de-glossing agents), biocides to fight microbial and/or plant growth, agents to modify or control surface tension, agents to improve or control flow properties such as thixotropic agents, agents to improve the finished appearance, agents to increase wet edge, agents to improve pigment stability, agents to impart anti-freeze properties, agents to control foaming, agents to control skinning, agents to catalyze drying. The coating composition may comprise one or more additives.

As used herein, the term "self-cleaning", "self-cleaning surface" and "self-cleaning layer" can be used interchangeably and are intended to include surfaces/layers that are resistant to dirt or contamination, or can prevent, remove or disintegrate organic or inorganic dirt, contamination, or micro-organisms from adhering or contaminating the surface/layer.

As used herein, the term "photocatalytic material" refers to a material for which a photocatalytic reaction occurs upon being irradiated with light. Examples of photocatalytic material include but not limited to metal oxides such as titanium dioxide, zinc oxide, tungsten oxide, silver oxide, tin oxide, and zirconium oxide.

The term "pigment" used herein refers to a material with light absorption properties, including absorption of electromagnetic radiation with wavelengths in the range of visible light, such as 380-750 nm, optionally altered by the addition of another material such as one or more pigments. Pigments can be granular solids incorporated into the paint to contribute color and opacity. Pigments can be classified as either inorganic or organic pigments. Inorganic pigments include but are not limited to e.g. titanium dioxide, carbon black or red and yellow iron oxides. The group of organic pigments includes synthesized and modified organic compounds with chromatic properties, such as phthalo blue, phthalo green and quinacridone. A pigment may also include one or more pigments disclosed in Industrial Inorganic Pigments, 3rd, Completely Revised and Extended Edition, Gunter Buxbaum and Gerhard Pfaff (Editors), (2005); and Industrial Organic Pigments: Production, Properties, Applications, 3rd, Completely Revised Edition, Willy Herbst, Klaus Hunger, (2004).

The term "filler" as used herein refers to any material, matter, component and composition added to thicken the coating, support its structure and simply increase the volume of the coating or to lower the cost. Fillers typically include cheap and inert materials, such as one or more of talc, calcium carbonate, kaolin, lime, baryte, clay, etc. Coating compositions that will be subjected to abrasion may contain fine quartz sand as a filler to ameliorate erosion by the abrasion.

The term "binder" used herein refers to a film-forming component of the coating composition. The binder may impart adhesion, bind the pigments together, and influence properties such as gloss potential, exterior durability, flexibility, and toughness. Binders include synthetic or natural resins such as acrylics, polyurethanes, polyesters, melamine resins, epoxy, alkyds, and modifications thereof. The term organic binder relates to binders made from organic polymeric materials.

The term "salt-bridge" used herein refers to a bond formed between positively charged and negatively charged groups. Examples of a salt bridge include but are not limited to a salt bridge formed between amine and carboxylic acid groups, a salt bridge formed between amine and sulfonic acid groups, a salt bridge formed between amine and phosphoric acid groups, a salt bridge formed between amine and phosphonic acid groups, and salt bridges formed between amine and other suitable acid groups.

As used herein, the term "water soluble" describes a compound that can be completely dissolved in water at a concentration at least of 3 grams per 100 mL of water at a pH equal to 7 and at 25° C.

The term "polymer" used herein includes both homopolymers and copolymers having various molecular architectures.

The term "alkyl" refers to a straight or branched monovalent hydrocarbon containing, unless otherwise stated, 1-20 carbon atoms (e.g., $C_1$-$C_{10}$). Examples of alkyl include, but are not limited to, methyl, ethyl, n-propyl, i-propyl, n-butyl, i-butyl, and t-butyl. The term "alkenyl" refers to a straight or branched monovalent or bivalent hydrocarbon containing 2-20 carbon atoms (e.g., $C_2$-$C_{10}$) and one or more double bonds. Examples of alkenyl include, but are not limited to, ethenyl, propenyl, propenylene, allyl, and 1,4-butadienyl. The term "alkynyl" refers to a straight or branched monovalent or bivalent hydrocarbon containing 2-20 carbon atoms (e.g., $C_2$-$C_{10}$) and one or more triple bonds. Examples of alkynyl include, but are not limited to, ethynyl, ethynylene, 1-propynyl, 1- and 2-butynyl, and 1-methyl-2-butynyl. The term "alkoxy" refers to an —O—alkyl radical. Examples of alkoxy include, but are not limited to, methoxy, ethoxy, n-propoxy, isopropoxy, n-butoxy, iso-butoxy, sec-butoxy, and tert-butoxy. The term "acyloxy" refers to an —O—C(O)—R radical in which R can be H, alkyl, alkenyl, alkynyl, cycloalkyl, cycloalkenyl, heterocycloalkyl, heterocycloalkenyl, aryl, or heteroaryl.

The term "cycloalkyl" refers to a monovalent or bivalent saturated hydrocarbon ring system having 3 to 30 carbon atoms (e.g., $C_3$-$C_{12}$). Examples of cycloalkyl include, but are not limited to, cyclopropyl, cyclobutyl, cyclopentyl, cyclohexyl, 1,4-cyclohexylene, cycloheptyl, cyclooctyl, and adamantine. The term "cycloalkenyl" refers to a monovalent or bivalent non-aromatic hydrocarbon ring system having 3 to 30 carbons (e.g., $C_3$-$C_{12}$) and one or more double bonds.

Examples include cyclopentenyl, cyclohexenyl, and cycloheptenyl. The term "heterocycloalkyl" refers to a monovalent or bivalent nonaromatic 5-8 membered monocyclic, 8-12 membered bicyclic, or 11-14 membered tricyclic ring system having one or more heteroatoms (such as O, N, S, or Se). Examples of heterocycloalkyl groups include, but are not limited to, piperazinyl, pyrrolidinyl, dioxanyl, morpholinyl, and tetrahydrofuranyl. The term "heterocycloalkenyl" refers to a monovalent or bivalent nonaromatic 5-8 membered monocyclic, 8-12 membered bicyclic, or 11-14 membered tricyclic ring system having one or more heteroatoms (such as O, N, S, or Se) and one or more double bonds.

The term "aryl" refers to a monovalent 6-carbon monocyclic, 10-carbon bicyclic, 14-carbon tricyclic aromatic ring system. Examples of aryl groups include, but are not limited to, phenyl, naphthyl, and anthracenyl. The term "arylene" refers to a bivalent 6-carbon monocyclic, 10-carbon bicyclic, 14-carbon tricyclic aromatic ring system. The term "aryloxyl" refers to an —O-aryl. The term "arylamino" refers to an —N(R)-aryl in which R can be H, alkyl, alkenyl, alkynyl, cycloalkyl, cycloalkenyl, heterocycloalkyl, heterocycloalkenyl, aryl, or heteroaryl. The term "heteroaryl" refers to a monvalent aromatic 5-8 membered monocyclic, 8-12 membered bicyclic, or 11-14 membered tricyclic ring system having one or more heteroatoms (such as O, N, S, or Se). Examples of heteroaryl groups include pyridyl, furyl, imidazolyl, benzimidazolyl, pyrimidinyl, thienyl, quinolinyl, indolyl, and thiazolyl. The term "heteroarylene" refers to a bivalent aromatic 5-8 membered monocyclic, 8-12 membered bicyclic, or 11-14 membered tricyclic ring system having one or more heteroatoms (such as O, N, S, or Se).

Optionally substituted alkyl, optionally substituted alkenyl, optionally substituted alkynyl, optionally substituted cycloalkyl, optionally substituted heterocycloalkyl, optionally substituted cycloalkenyl, optionally substituted heterocycloalkenyl, optionally substituted aryl, and optionally substituted heteroaryl mentioned above include both substituted and unsubstituted moieties. Possible substituents on amino, cycloalkyl, heterocycloalkyl, cycloalkenyl, heterocycloalkenyl, aryl, arylene, heteroaryl, and heteroarylene include, but are not limited to, $C_1$-$C_{10}$ alkyl, $C_2$-$C_{10}$ alkenyl, $C_2$-$C_{10}$ alkynyl, $C_3$-$C_{20}$ cycloalkyl, $C_3$-$C_{20}$ cycloalkenyl, $C_1$-$C_{20}$ heterocycloalkyl, $C_1$-$C_{20}$ heterocycloalkenyl, $C_1$-$C_{10}$ alkoxy, aryl, aryloxy, heteroaryl, heteroaryloxy, amino, $C_1$-$C_{10}$ alkylamino, arylamino, hydroxy, halo, oxo (O=), thioxo (S=), thio, silyl, $C_1$-$C_{10}$ alkylthio, arylthio, $C_1$-$C_{10}$ alkylsulfonyl, arylsulfonyl, acylamino, aminoacyl, aminothioacyl, amidino, mercapto, amido, thioureido, thiocyanato, sulfonamido, guanidine, ureido, cyano, nitro, acyl, thioacyl, acyloxy, carbamido, carbamyl (—C(O)NH$_2$), carboxyl (—COOH), and carboxylic ester. On the other hand, possible substituents on alkyl, alkenyl, alkynyl, or alkylene include all of the above-recited substituents except $C_1$-$C_{10}$ alkyl. Cycloalkyl, cycloalkenyl, heterocycloalkyl, heterocycloalkenyl, aryl, and heteroaryl can also be fused with each other.

Coating Compositions

A strong demand exists for coatings and surfaces that minimize the need for cleaning. The financial and environmental benefits offered by these materials are highly appealing to consumers. One strategy for producing self-cleaning surfaces is to use extremely hydrophilic materials. As hydrophobic debris is repelled from this type of surface, and hydrophilic debris is attracted to water, hydrophilic coatings allow water to clean the surface without the need for scrubbing or the use of harsh chemicals.

Hydrophilic self-cleaning surfaces may be formed by utilizing particles of hydrophilic minerals such as titanium dioxide or calcium carbonate dispersed into a medium. Increasing the hydrophilicity of the medium could increase the hydrophilicity of the surface and enhance its self-cleaning characteristics. However, these materials do not always meet the requirement of curing into a strong and insoluble hydrophilic matrix. The particles of minerals may also aggregate in the medium during storage. Aggregation in the medium will not only reduce shelf-life but also make the coating difficult to apply.

The coating composition disclosed herein can cure into an insoluble hydrophilic matrix and yet do not have aggregation of particles in solution during storage. In addition, the use of photo-cleavable protecting groups in the coating composition disclosed herein allows water soluble components to be stored in solution for extended periods of time and to later cure into an insoluble matrix upon application to a surface. Moreover, the hydrophilicity levels of the coatings may be further increased by dispersing hydrophilic minerals such as titanium oxide into a highly hydrophilic network. Applications for this type of coating composition may include but are not limited to anti-fog coatings and biocompatible hydrophilic coatings.

The coating composition can include a first polymer including at least one positively charged group; a second polymer including at least one negatively charged group; and at least one protecting group contacting the positively charged group of the first polymer, the negatively charged group of the second polymer, or both, wherein the at least one protecting group is configured to be removed by photocleavage to form a salt bridge between the positively and negatively charged groups.

The coating composition can include at least one self-cleaning mineral. The self-cleaning mineral can be a photocatalytic material. In other embodiments, the self-cleaning mineral can be titanium oxide, calcium carbonate, cobalt oxide, chromium oxide, iron oxide, tin oxide, silicon oxide, zirconium oxide, aluminum oxide, magnesium oxide, zinc oxide, magnesium oxide, silver oxide, or combinations thereof.

In some embodiments, the self-cleaning mineral can be titanium oxide. The titanium oxide can be selected from anatase titanium dioxide, rutile titanium dioxide, brookite titanium dioxide and mixtures thereof.

In other embodiments, the self-cleaning mineral can be calcium carbonate. In some embodiments, the self-cleaning mineral can be cobalt oxide. In some embodiments, the self-cleaning mineral can be chromium oxide. In some embodiments, the self-cleaning mineral can be iron oxide. In some embodiments, the self-cleaning mineral can be tin oxide. In some embodiments, the self-cleaning mineral can be silicon oxide. In some embodiments, the self-cleaning mineral can be zirconium oxide. In some embodiments, the self-cleaning mineral can be aluminum oxide. In some embodiments, the self-cleaning mineral can be magnesium oxide. In some embodiments, the self-cleaning mineral can be zinc oxide. In some embodiments, the self-cleaning mineral can be magnesium oxide. In some embodiments, the self-cleaning mineral can be silver oxide.

Figure 1:
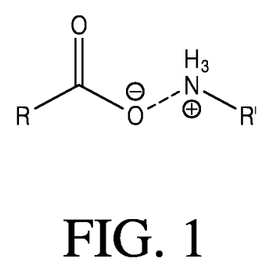
FIG. 1 illustrates an example of a salt bridge between amino and carboxylic acid groups.

The coating composition can be hydrophilic when the salt bridge is formed. A salt bridge can be formed between positively charged and negatively charged groups. As shown in FIG. 1, a salt bridge may form between amino and carboxylic acid groups. The interactions between the amino and carboxylic acid groups create a combination of hydrogen and ionic bonds. The same electrostatic forces that create salt bridges can strongly attract water molecules, resulting in the salt bridges being suitable for use in hydrophilic coating compositions.

The first polymer can include at least one positively charged group, and the positively charged group can include at least one base. In some embodiments, the positively charged group can include at least one amine or ammonium group. The first polymer can be polyallylamine, poly(diallyldimethylammonium chloride), salts thereof, or copolymers thereof. In some embodiments, the first polymer can be polyallylamine or its salt. In other embodiments, the first polymer can be poly(diallyldimethylammonium chloride) or its salt. In some embodiments, the first polymer can be copolymers of polyallylamine and poly(diallyldimethylammonium chloride).

The second polymer can include at least one negatively charged group, and the negatively charged group can include at least one acid group. Examples of acid groups include but not limited to carboxylic acid, sulfonic acid, phosphoric acid, phosphonic acid, and boric acid. In some embodiments, the negatively charged group can include at least one carboxylic acid group. In some embodiments, the negatively charged group can include at least one sulfonic acid. In some embodiments, the negatively charged group can include at least one phosphoric acid. In some embodiments, the negatively charged group can include at least one phosphonic acid. In some embodiments, the negatively charged group can include at least one boron acid.

The second polymer can be any water soluble polymer containing at least one acid group. The second polymer can be selected from polyacrylic acid, polymethacrylic acid, polyitanconic acid, polycifraconic acid, polybenzoic acid, polymeric derivatives of half carboxylic esters of malonates, salts thereof, or copolymers thereof. In some embodiments, the second polymer can be polyacrylic acid or its salt. In some embodiments, the second polymer can be polymethacrylic acid or its salt. In some embodiments, the second polymer can be polyitanconic acid or its salt. In some embodiments, the second polymer can be polycifraconic acid or its salt. In some embodiments, the second polymer can be polybenzoic acid or its salt. In some embodiments, the second polymer can be polymeric derivatives of half carboxylic esters of malonates or its salt.

Figure 2:
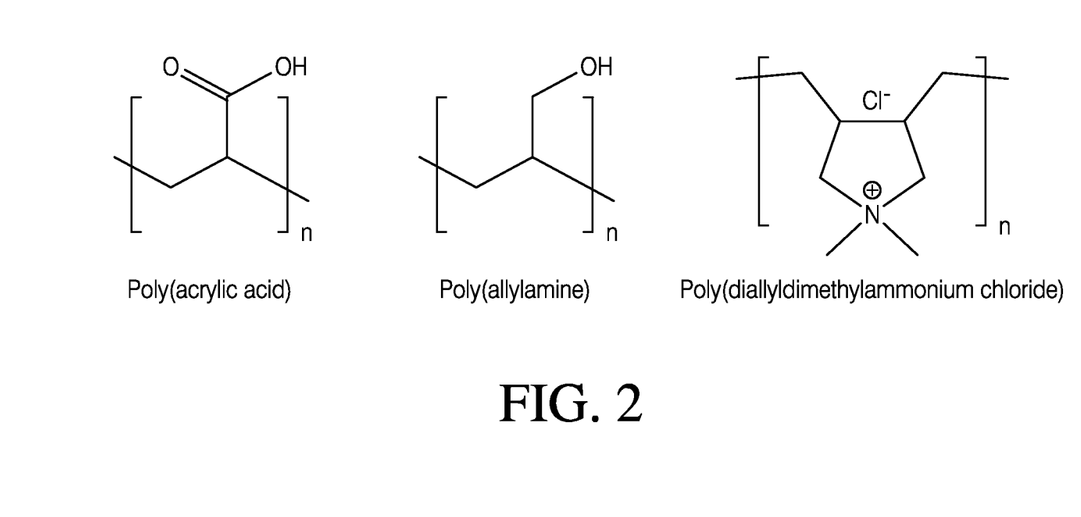
FIG. 2 illustrates some examples of the first and second polymers in the coating composition.
Figure 3:
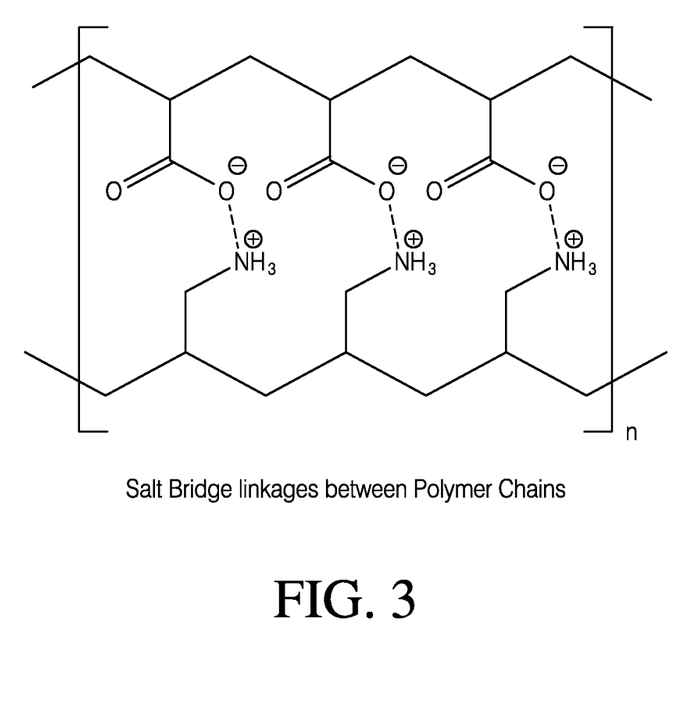
FIG. 3 illustrates an example of salt bridge linkage between poly(acrylic acid) and poly(allylamine).

FIG. 2 illustrates some examples of polymers that are candidates for use in the coating composition. Polymers such as poly(acrylic acid), poly(allylamine), and poly(diallyldimethylammonium chloride) are water soluble. The water solubility of these polymers allows them to be used in water-based paints, reducing or minimizing the use of volatile organic solvents. Polymers containing carboxylic acid groups, e.g. poly(acrylic acid), can react with polymers containing amine or ammonium groups, e.g. poly(allylamine) or poly(diallyldimethylammonium chloride), to form salt bridges as shown in FIG. 3. Under suitable circumstances, a blend of these polymers are cross-linked by the salt-bridges formed and harden into a hydrophilic and water insoluble network suited for use in hydrophilic coatings.

In some embodiments, the molecular weight of the first polymer may be in a range from about 10,000 to about 500,000. For example, the molecular weight of the first polymer may be about 10,000, about 50,000, about 100,000, about 150,000, about 200,000, about 250,000, about 300,000, about 350,000, about 400,000, about 450,000, about 500,000, or a range between any of these values. When the first polymer in the composition is poly(allyamine), the molecular weight of the first polymer may be in a range from about 17,000 (300 units) to about 65,000 (1100 units). When the first polymer in the composition is Poly(diallyldimethylammonium chloride), the molecular weight of the first polymer may be in a range from about 100,000 (620 units) to about 500,000 (3,100 units). In some embodiments, the molecular weight of the first polymer may be in a range from about 50,000 to about 500,000. In some embodiments, the molecular weight of the first polymer may be in a range from about 100,000 to about 500,000.

In some embodiments, the molecular weight of the second polymer may be in a range from about 1,000 to about 5,000,000. For example, the molecular weight of the second polymer may be about 1,000, about 10,000, about 100,000, about 500,000, about 1,000,000, about 1,500,000, about 2,000,000, about 2,500,000, about 3,000,000, about 3,500,000, about 4,000,000, about 4,500,000, about 5,000,000, or a range between any of these values. When the second polymer used in the composition is poly(acrylic acid), the molecular weight of the poly(acrylic acid) may be in a range from about 1,800 (25 units) to about 4,500,000 (62,5000 units). In some embodiments, the molecular weight of the poly(acrylic acid) may be in a range from about 1,000 to about 5,000,000. In some embodiments, the molecular weight of the poly(acrylic acid) may be in a range from about 2,000 to about 4,500,000. In some embodiments, the molecular weight of the poly(acrylic acid) may be in a range from about 10,000 to about 5,000,000. In some embodiments, the molecular weight of the poly(acrylic acid) may be in a range from about 20,000 to about 5,000,000. In some embodiments, the molecular weight of the poly(acrylic acid) may be in a range from about 100,000 to about 5,000,000. In some embodiments, the molecular weight of the poly(acrylic acid) may be in a range from about 1,800 to about 2,500,000. In some embodiments, the molecular weight of the poly(acrylic acid) may be in a range from about 1,800 to about 1,500,000. In some embodiments, the molecular weight of the poly(acrylic acid) may be in a range from about 1,800 to about 1,000,000.

The molecular weight of the second polymer and the first polymer may be different from each other. However, the number of the acid groups in the first polymer may substantially be equal to the number of amino groups in the second polymer. In some embodiments, the number of the acid groups in the first polymer can be equal to the number of amino groups in the second polymer. In some embodiments, the number of the acid groups in the first polymer can be in the range of from about 90% to about 110% of the number of amino groups in the second polymer.

The ratio of an amount of the first polymer to an amount of the second polymer in the coating composition may be adjusted to create an optimal number of salt-bridges. In some embodiments, the molar ratio of the first polymer to the second polymer in the coating composition can be in a range from about 0.001:1 to about 100:1. For example, the molar ratio can be about 0.001:1, 0.01:1, 0.1:1, 1:1, 10:1, 50:1, 100:1, or a range between any of these ratios. In some embodiments, the molar ratio of the first polymer to the second polymer can be about 1:1. In some embodiments, the molar ratio of the first polymer to the second polymer can be in a range from about 0.1:1 to about 10:1. In some embodiments, the molar ratio of the first polymer to the second polymer can be in a range from about 0.01:1 to about 10:1. In some embodiments, the molar ratio of the first polymer to the second polymer can be in a range from about 0.001:1 to about 10:1. In some embodiments, the molar ratio of the first polymer to the second polymer can be in a range from about 0.001:1 to about 1:1.

The amount of self-cleaning mineral in the coating composition may vary depending on the types of minerals. In some embodiments, the amount of self-cleaning mineral in the coating composition is about 0.001% to about 50% by weight. For example, the amount can be about 0.001% by weight, about 0.01% by weight, about 0.1% by weight, about 1% by weight, about 5% by weight, about 10% by weight, about 20% by weight, about 30% by weight, about 40% by weight, about 50% by weight, or a range between any of these values. In some embodiments, the amount of self-cleaning mineral in the coating compositing can be in a range of from about 0.01% to about 10% by weight. In some embodiments, the amount of self-cleaning mineral in the coating compositing can be in a range of from about 0.01% to about 20% by weight. In some embodiments, the amount of self-cleaning mineral in the coating compositing can be in a range of from about 0.01% to about 50% by weight. In some embodiments, the amount of self-cleaning mineral in the coating compositing can be in a range of from about 0.001% to about 10% by weight. In some embodiments, the amount of self-cleaning mineral in the coating compositing can be in a range of from about 0.01% to about 5% by weight. In some embodiments, the amount of self-cleaning mineral in the coating compositing can be in a range of from about 0.001% to about 20% by weight. In some embodiments, the amount of self-cleaning mineral in the coating composition can be in a range of from about 0.01% to about 50% by weight.

The formation of the salt bridges can be prevented after the coating has been applied to the desired surface. One way to control the salt-bridge formation is to use photo-cleavable protecting groups. The protecting groups may be used to protect the positively charged groups, the negatively charged groups, or both. In some embodiments, only the positively charged groups may be protected. In some embodiments, only the negatively charged groups may be protected. In other embodiments, both the positively and negatively charged groups may be protected.

The protecting group can be selected independently from phenacyl, o-nitrobenzyl, acetophenones, benzoins, cinnamate esters, coumaryl, or combinations thereof. In some embodiments, the protecting group can be phenacyl. In some embodiment, the protecting group can be o-nitrobenzyl. In some embodiments, the protecting group can be acetophenones. In some embodiments, the protecting group can be benzoins. In some embodiments, the protecting group can be cinnamate esters. In some embodiments, the protecting group can be coumaryl.

Figure 4:
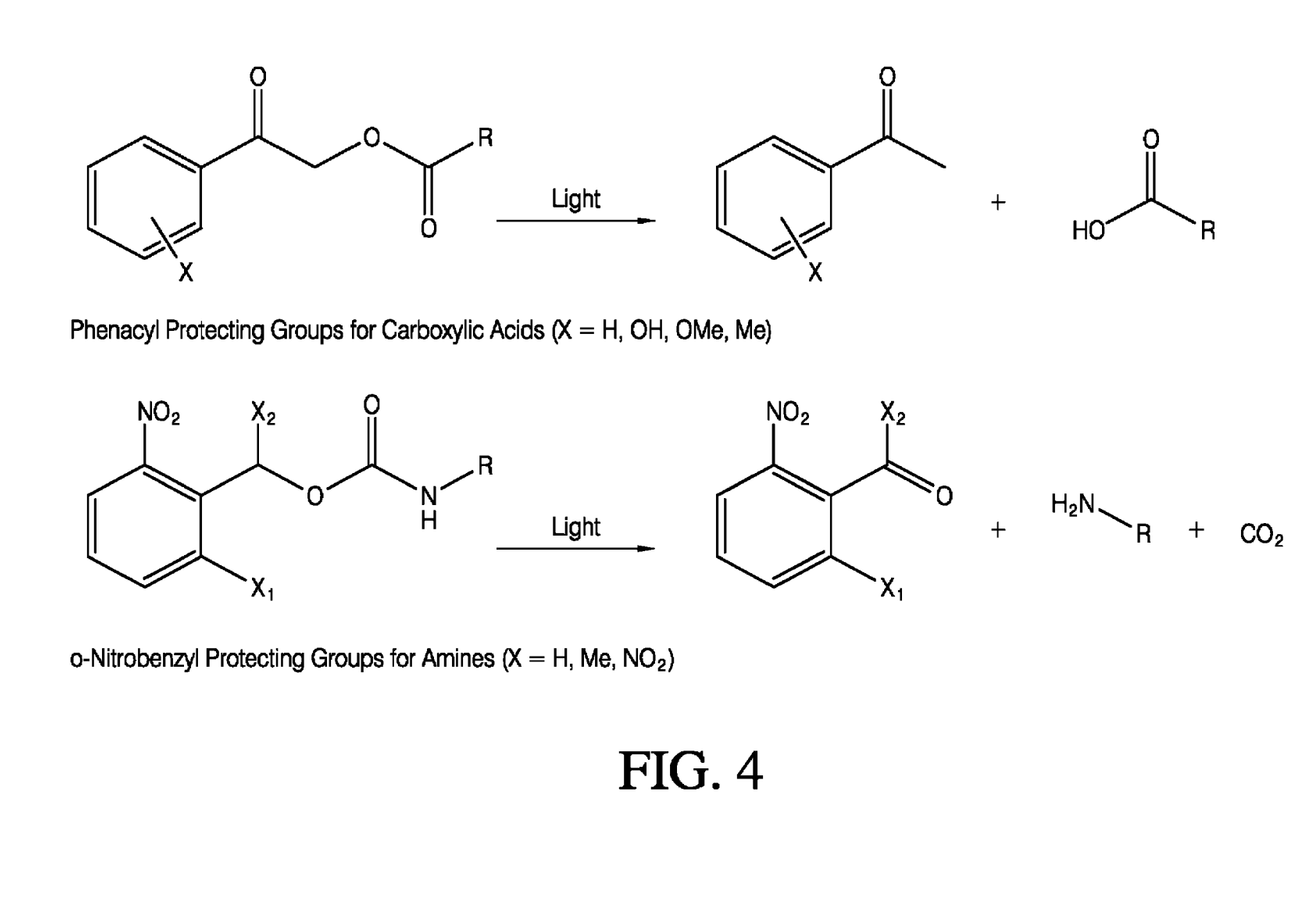
FIG. 4 illustrates an example of some photo-cleavable protecting groups for amines and carboxylic acid groups.

Protecting groups can be used to control the timing of salt-bridges formation in the coating composition, thus providing control to the curing of the coating composition. For example, the process of salt bridge formation can be blocked by the use of photo-cleavable protecting groups. As shown in FIG. 4, the protecting group would be attached to the carboxylic acid group or the amino group in either the first or the second polymer. Upon exposure to photo radiation or heating, these protecting groups can be removed from the protected carboxylic acid group, the protected amino group, or both. This cleavage regenerates the carboxylic acid group, the amino group, or both, allowing salt bridges to be formed between these functional groups.

The substitution groups on the protecting groups may be used to tune the protecting group to the desired water solubility and sensitivity to light and activation wavelength. The protecting group may be optionally substituted with one or more substitution groups including, but are not limited to, hydrogen, alkyl, alkenyl, alkynyl, cycloalkyl, heterocycloalkyl, cycloalkenyl, heterocycloalkenyl, nitro, amino, halo, alkoxy, phenoxy, hydroxyl, nitrile, carboxylic acid, amide, ester, aryl, and heteroaryl. For example, as shown in FIG. 4, the substitution group X in the phenacyl protecting group of the poly(carboxylic acid) can include hydrogen, hydroxyl, methyl, and methoxy groups. The substitution groups $X_1$ and $X_2$ in the o-Nitrobenzyl protecting group for the poly(amines) can include but not limited to hydrogen, methyl and nitro groups. The substituents on the protecting group may be optionally substituted.

The position of the substitution groups on the protecting groups may also be changed to tune the protecting group to the desired water solubility and sensitivity to light and activation wavelength. For example, as shown in FIG. 4, the substitution group X in the phenacyl protecting group may be positioned in any of the para, meta, or ortho positions. In some embodiments, the position of the substitution groups is not limited.

The coating composition may include one or more solvents. In some embodiments, the solvent can be water. In some embodiments, the solvent can be a mixture of water and one or more organic solvents. A variety of organic solvents can be used in a composition described herein. Examples of the organic solvent include but not limited to acetaldehyde, acetone, acetonitrile, 1,2-butanediol, 1,3-butanediol, 1,4-butanediol, 2-butoxyethanol, dimethylformamide, dimethoxyethane, dimethyl sulfoxide, 1,4-dioxane, methanol, ethanol, ethylene glycol, furfuryl alcohol, glycerol, 1-propanol, isopropanol, 1,5-pentanediol, 1,3-propanediol, propylene glycol, tetrahydrofuran and triethylene glycol, ethyl acetate or combinations thereof. In some embodiments, the organic solvent can be ethanol. In some embodiments, the organic solvent can be acetone. In some embodiments, the organic solvent can be tetrahydrofuran.

One or more pigments may be included in the coating composition. In some embodiments, the pigment can be an inorganic pigment. Examples of suitable inorganic pigment include but are not limited to titanium dioxide, carbon black or red and yellow iron oxides. In some embodiments, the pigment can be an organic pigment. Examples of suitable inorganic pigment include but are not limited to phthalo blue, phthalo green and quinacridone.

One or more binders may be included in the coating composition. In some embodiments, the binder can be synthetic or natural resins such as acrylics, polyurethanes, polyesters, melamine resins, epoxy, alkyds, acrylics, and copolymers thereof.

One or more additives may be included in the coating composition. The additive can be catalysts, thickeners, stabilizers, emulsifiers, texturizers, adhesion promoters, UV stabilizers, flatteners (de-glossing agents), biocides to fight microbial and/or plant growth, agents to modify or control surface tension, agents to improve or control flow properties such as thixotropic agents, agents to improve the finished appearance, agents to increase wet edge, agents to improve pigment stability, agents to impart anti-freeze properties, agents to control foaming, agents to control drying. In some embodiments, the additive can be a thickener. In some embodiments, the additive can be a stabilizer. In some embodiments, the additive can be an emulsifier. In some embodiments, the additive can be a texturizer. In some embodiments, the additive can be an adhesion promoter. In some embodiments, the additive can be a UV stabilizer. In some embodiments, the additive can be a flattener such as a de-glossing agent. In some embodiments, the additive can be a biocide to prevent or reduce microbial and/or plant growth. In some embodiments, the additive can be an agent to modify or control surface tension. In some embodiments, the additive can be an agent to improve or control flow properties such as thixotropic agents. In some embodiments, the additive can be an agent to improve the finished appearance. In some embodiments, the additive can be an agent to increase wet edge. In some embodiments, the additive can be an agent to improve pigment stability. In some embodiments, the additive can be an agent to impart anti-freeze properties. In some embodiments, the additive can be an agent to control foaming. In some embodiments, the additive can be an agent to control drying.

A coating composition can include at least one self-cleaning mineral; and a medium for dispersing the at least one self-cleaning mineral, wherein the medium comprises a first polymer comprising at least one positively charged group, a second polymer comprising at least one negatively charged group, and at least one protecting group contacting the positively charged group of the first polymer, the negatively charged group of the second polymer, or both, wherein the at least one protecting group is configured to be removed by photocleavage to form a salt bridge between the positively and negatively charged groups.

Methods of Making Coating Compositions

A method of making a hydrophilic coating composition can include providing a mixture including a first polymer comprising at least one positively charged group, a second polymer comprising at least one negatively charged group, and at least one protecting group contacting the positively charged group of the first polymer, the negatively charged group of the second polymer, or both, wherein the at least one protecting group is configured to be removed by photocleavage to form a salt bridge between the positively and negatively charged groups. The method may further include exposing the mixture to photo radiation for a time period sufficient to remove at least a portion of the protecting groups to form the salt bridge between the positively and negatively charged groups.

The protecting groups may be attached to the positively charged group of the first polymer, the negatively charged group of the second polymer, or both through various reaction schemes depending on the type of protecting groups and the charged groups. Reaction schemes I and II below illustrate examples of attaching the protecting groups to carboxylic acids and amines.

Attachment of Phenacyl Protecting Groups to Carboxylic Acids (X = H, OH, OMe, Me)

Attachment of o-Nitrobenzyl Protecting Groups to Amines (X = H, Me, $NO_2$)

Referring to reaction scheme I, phenacyl bromide may be attached to carboxylic acids at a temperature of about 0° C. to about 100° C. in the presence of a non-nucleophilic base such as a triethyl amine or an alkali carbonate. A variety of solvents may be used including water, various organic solvents or blends of water and organic solvents. Referring to reaction scheme II, amines can react with o-nitrobenzyl at a temperature of about 0° C. to about 100° C. in the presence of a non-nucleophilic base such as a triethyl amine. Polar aprotic solvents such as DMF, THF may be used.

The method of making a hydrophilic coating composition may include adding at least one self-cleaning mineral to the mixture. The adding of the self-cleaning mineral may be performed before the exposing step. Examples of self-cleaning minerals include but are not limited to titanium oxide, calcium carbonate, cobalt oxide, chromium oxide, iron oxide, tin oxide, silicon oxide, zirconium oxide, aluminum oxide, magnesium oxide, zinc oxide, magnesium oxide, silver oxide, or combinations thereof.

The step of providing a mixture may include applying the mixture to a substrate. The step of applying the mixture to a substrate can be performed at a suitable temperature range. In some embodiments, the temperature for applying the mixture may be from about 0° C. to about 100° C. For example, the temperature can be about 0° C., about 10° C., about 20° C., about 30° C., about 40° C., about 50° C., about 60° C., about 70° C., about 80° C., about 90° C., about 100° C., or a range between any of these values. In some embodiments, the temperature for applying the mixture can be from about 0° C. to about 80° C. In some embodiments, the temperature, the temperature for applying the mixture can be from about 0° C. to about 60° C. In some embodiments, the temperature for applying the mixture can be from about 0° C. to about 50° C. In some embodiments, the temperature for applying the mixture can be from about 10° C. to about 50° C. In some embodiments, the temperature for applying the mixture can be from about 0° C. to about 40° C. In some embodiments, the temperature, the temperature for applying the mixture can be from about 10° C. to about 40° C.

Removing the protecting group can be achieved by using a source of radiation sufficient to cleave the protecting groups from the protected positively charged group, the protected negatively charged group, or both. For example, the mixture can be exposed to radiation in a visible or ultraviolet range of the spectrum. In some embodiments, the photo radiation can be of a wavelength of about 100 to about 700 nm. For example, the wavelength can be about 100 nm, about 150 nm, about 200 nm, about 250 nm, about 300 nm, about 350 nm, about 400 nm, about 450 nm, about 500 nm, about 550 nm, about 600 nm, about 650 nm, about 700 nm, or a range between any of these values. In some embodiments, the photo radiation can be of a wavelength of about 300 to about 600 nm. In some embodiments, the photo radiation can be of a wavelength of about 200 to about 400 nm. In some embodiments, the photo radiation can be of a wavelength of about 300 to about 350 nm. In some embodiments, the protecting group may be cleaved by ultraviolet radiation of about 330 to about 350 nm.

The mixture can be exposed to the radiation for a duration that may vary depending on the intensity of the photo radiation and the nature of the protecting group or substrate. In some embodiments, the coating mixture may be exposed to photo radiation for about 5 minutes to about 24 hours. For example, the exposure can occur for about 5 minutes, about 30 minutes, about 1 hour, about 5 hours, about 10 hours, about 15 hours, about 20 hours, about 24 hours, or a range between any of these values. In some embodiments, the coating mixture may be exposed to photo radiation for about 1 hour to about 10 hours. In some embodiments, the coating mixture may be exposed to photo radiation for about 3 hours to about 8 hours. In some embodiments, the coating mixture may be exposed to photo radiation for about 4 hours to about 6 hours. The duration of exposure of the coating mixture to the radiation may also be tuned based on by varying protecting group or light intensity.

Light sources that can provide output radiation sufficient to cleave the protecting groups and promote formation of salt bridges may be used. Suitable light sources can include either natural photo radiation (that is, solar radiation) or external artificial photo radiation sources. The external artificial photo radiation sources may include, for example, metal halide bulbs, or other suitable bulbs that provide an activating source of photo radiation.

The duration and intensity for which the mixture is exposed to a source of photo radiation depends on a number of factors, including but are not limited to the type of protecting groups used in the coating mixture, the type of polymers contained in the coating mixture, the thickness of the coating, the incident angle of the photo radiation on the coating, the intensity of the source of radiation at the coating mixture, the reaction rate of the salt-bridge formation desired or required, the degree to which the photo radiation may be reflected or absorbed by the substrate and/or any other coatings or layers present thereon. It will be appreciated that a skilled person can control the duration and intensity for which the mixture is exposed to photo radiation to obtain the desired coating.

Removing the protecting group may also be achieved by heating the coating mixture at a temperature sufficient to cleave the protecting groups of the protected positively charged group, the protected negatively charged group, or both. The duration and intensity for which the mixture is heated depends on a number of factors, including but not limited to the type of protecting groups used in the coating mixture, the type of polymers contained in the coating mixture, the thickness of the coating, and the reaction rate of the salt-bridge formation desired or required. It will be appreciated that a skilled person can control the duration and intensity for which the mixture is heated to obtain the desired coating.

A portion of the protecting groups may be removed from the protected positively charged or negatively charged groups upon photo radiation or heating. In some embodiments, the portion of protecting groups removed from the protected positively or negatively charged groups may be no less than 95%. In some embodiments, the portion of protecting groups removed from the protected positively or negatively charged groups may be no less than 90%. In some embodiments, the portion of protecting groups removed from the protected positively or negatively charged groups may be no less than 80%. In some embodiments, the portion of protecting groups removed from the protected positively or negatively charged groups may be no less than 60%. In some embodiments, the portion of protecting groups removed from the protected positively or negatively charged groups may be no less than 50%. In some embodiments, the portion of protecting groups removed from the protected positively or negatively charged groups may be no less than 30%. In some embodiments, the portion of protecting groups removed from the protected positively or negatively charged groups may be in a range of about 30% to about 60%. In some embodiments, the portion of protecting groups removed from the protected positively or negatively charged groups may be in a range of about 40% to about 70%. In some embodiments, the portion of protecting groups removed from the protected positively or negatively charged groups may be in a range of about 50% to about 90%.

The steps of applying the mixture and exposing can be performed either simultaneously or sequentially. In some embodiments, the applying and exposing steps may be performed simultaneously. In some embodiments, the applying and the exposing may be performed sequentially, and the step of exposing may be performed after the step of applying. In some embodiments, the applying and the exposing may be performed sequentially, and the step of exposing may be performed before the step of applying.

Prior to application to a surface, the mixture may be protected from photo radiation in a visible or ultraviolet range. The mixture may be shielded from photo radiation using suitable methods. Examples of shielding methods include but are not limited to the use of metal or other opaque containers, or storage in dark areas.

A method of making a storage-stable coating composition may include providing a mixture including a first polymer comprising at least one positively charged group, a second polymer comprising at least one negatively charged group, and at least one protecting group contacting the positively charged group of the first polymer, the negatively charged group of the second polymer, or both, wherein the at least one protecting group is configured to be removed by photocleavage to form a salt bridge between the positively and negatively charged groups; and shielding the mixture from radiation in a visible or ultraviolet range.

The method of making a storage-stable coating composition may further include adding at least one self-cleaning mineral to the mixture. The self-cleaning mineral added can be a photocatalytic material.

The storage-stable coating composition may be stored at a suitable temperature. In some embodiments, the coating composition may be stored at a temperature of about 0° C. to about 100° C. For example, the coating composition may be stores at a temperature of about 0° C., about 10° C., about 20° C., about 30° C., about 40° C., about 50° C., about 60° C., about 70° C., about 80° C., about 90° C., about 100° C., or a range between any of these values. In some embodiments, the coating composition may be stored at a temperature of about 0° C. to about 50° C. In some embodiments, the coating composition may be stored at a temperature of about 10° C. to about 50° C. In some embodiments, the coating composition may be stored at a temperature of about 15° C. to about 45° C.

The mixture may be shielded from photo radiation during storage, so as to prevent photocleavage of the protecting groups before the coating is used to coat a surface. Examples of shielding methods include but not limited to the use of metal or other opaque containers, or storage in dark areas.

Methods of Coating

A method of coating a substrate can include applying a coating composition to the substrate, wherein the coating composition includes a first polymer including at least one positively charged group, a second polymer including at least one negatively charged group, and at least one protecting group contacting the positively charged group of the first polymer, the negatively charged group of the second polymer, or both; wherein the at least one protecting group is configured to be removed by photocleavage to form a salt bridge between the positively and negatively charged groups.

The step of applying the coating composition to the substrate may include applying the coating composition by one or more of the following operations: brushing the coating composition on the substrate; dipping the substrate in the coating composition; spraying the coating composition on the substrate; spreading the coating composition on the substrate; and rolling the coating composition on the substrate.

Other suitable methods for applying a coating composition to the substrate may also include sol-gel, spray pyrolysis, chemical vapor deposition, and magnetron sputtering vacuum deposition over the surface of the substrate.

An article of manufacture can include a coating covering at least a portion of the article, wherein the coating can include a first polymer comprising at least one positively charged group, a second polymer comprising at least one negatively charged group, and at least one protecting group contacting the positively charged group of the first polymer, the negatively charged group of the second polymer, or both; wherein the at least one protecting group is configured to be removed by photocleavage to form a salt bridge between the positively and negatively charged groups.

EXAMPLES

Example 1—Coating Composition

A coating composition is created by dissolving poly(allylamine), protected poly(acrylic acid) and titanium oxide in water at 40° C. The concentrations of these materials in water can be 20%, 46%, and 2% respectively by weight. In the composition, 50% of the carboxylic acid groups in the poly(acrylic acid) are expected to be protected with phenacyl protecting groups (X=H from FIG. 4). This coating composition is expected to result in a 1:1 molar ratio of carboxylic acid and amine groups once deprotected. The mixture is stirred at 60 rpm to suspend the titanium oxide in the mixture.

Another coating composition is created by dissolving poly(acrylic acid), protected poly(allylamine) and titanium oxide in a 50/50 by volume blend of water and ethanol at room temperature. The concentrations of these materials can be 20%, 40%, and 2% respectively by weight. In the composition, 50% of the amine groups in the poly(allylamine) are expected to be protected with o-nitrobenzyl protecting groups ($X_1$ and $X_2$=H from FIG. 4). This coating composition is expected to result in a 1:1 molar ratio of carboxylic acid and amine groups once deprotected. The mixture is stirred at 60 rpm to suspend the titanium oxide in the mixture.

Example 2—an Article Coated with Either One of the Coating Compositions from Example 1 and Hydrophilic Self-Cleaning Properties of the Coated Surface An example application involves spraying an article with either one of the coating compositions from Example 1 at room temperature and allowing the coating composition to air dry for 24 hours at room temperature. The coating composition can then be exposed to 300 nm UV-light for 4 hours in order to deprotect the poly(acrylic acid) and result in salt bridge formation.

Another example application involves dipping the article into either one of the coating compositions from Example 1 at room temperature and allowing the coating composition to air dry for 24 hours at room temperature. The coating composition can then be exposed to 350 nm UV-light for 3 hours in order to deprotect the poly(acrylic acid) and result in salt bridge formation.

The resulting coated surfaces can be extremely hydrophilic and is expected to demonstrate very low contact angle with water. The coated surfaces are expected to exhibit self-cleaning effect. The hydrophilic surface may allow water to spread out thinly, carrying dirt and debris away as the water flows over the surface, thus minimizing the need for surfactants or other cleaning agents. Exposure of the coated surfaces to UV-light can cause the titanium oxide to generate reactive oxygen species that can bleach stains and kill microbes.

Example 3—Storage-Stable Coating Compositions

An example composition can be created by dissolving poly(allylamine), protected poly(acrylic acid) and titanium oxide in water at 40° C. The concentrations of these materials can be 20%, 46%, and 2% respectively by weight. In the composition, 50% of the carboxylic acid groups in the poly(acrylic acid) are expected to be protected with phenacyl protecting groups (X=H from FIG. 4). This composition is expected to result in a 1:1 molar ratio of carboxylic acid and amine groups once deprotected. Stirring at 60 rpm is used to suspend the titanium oxide in the mixture. The composition can be stored at room temperature in opaque containers to prevent exposure to light. The composition is expected to remain stable, or the carboxylic acid groups in the poly(acrylic acid) may continue to be protected with the phenacyl protecting groups, for as long as the composition is shielded from light.

Another example composition can be created by dissolving poly(acrylic acid), protected poly(allylamine) and titanium oxide in a 50/50 by volume blend of water and ethanol at room temperature. The concentrations of these materials can be 20%, 40%, and 2% respectively by weight. In the composition, 50% of the amine groups in the poly(allylamine) are expected to be protected with o-nitrobenzyl protecting groups ($X_1$ and $X_2$=H from FIG. 4). This composition is expected to result in a 1:1 molar ratio of carboxylic acid and amine groups once deprotected. Stirring at 60 rpm is used to suspend the titanium oxide in the mixture. The composition can be stored at room temperature in opaque containers to prevent exposure to light. The composition is expected to remain stable, or the amine groups in the poly(allylamine) may continue to be protected with the o-nitrobenzyl protecting groups, for as long as the composition is shielded from light.

Example 4—Attaching Protecting Groups to the First and the Second Polymers

Protection of the poly(acrylic acid) can be accomplished by dissolving the poly(acrylic acid), phenacyl bromide, and triethyl amine in a 50/50 by volume mixture of water and ethanol. The concentrations would be 18%, 25%, and 13% respectively by weight. The mixture can be heated to 50° C. for 6 hours.

Protection of the poly(allylamine) can be accomplished by dissolving the poly(allylamine), o-nitrobenzyl chloroformate, and triethyl amine in tetrahydrofuran. The concentrations can be 13%, 25%, and 12% respectively by weight. The mixture can be allowed to react at room temperature for 2 hours.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A coating composition, comprising:
    a first polymer comprising at least one positively charged group;
    a second polymer comprising at least one negatively charged group; and
    at least one protecting group contacting the at least one positively charged group of the first polymer, the at least one negatively charged group of the second polymer, or both, wherein the at least one protecting group is configured to be removed by photo cleavage to form a salt bridge between the at least one positively and at least one negatively charged groups.

2. The coating composition of claim 1, further comprising at least one self-cleaning mineral.

3. The coating composition of claim 2, wherein the at least one self-cleaning mineral is a photocatalytic material.

4. The coating composition of claim 2, wherein the at least one self-cleaning mineral is titanium oxide, calcium carbonate, cobalt oxide, chromium oxide, iron oxide, tin oxide, silicon oxide, zirconium oxide, aluminum oxide, magnesium oxide, zinc oxide, magnesium oxide, silver oxide, or combinations thereof.

5. The coating composition of claim 2, wherein the amount of the at least one self-cleaning mineral in the coating composition is about 0.01% to about 10% by weight.

6. The coating composition of claim 1, wherein the at least one positively charged group comprises at least one base.

7. The coating composition of claim 1, wherein the at least one positively charged group comprises at least one amine or ammonium group.

8. The coating composition of claim 1, wherein the first polymer is polyallylamine, poly(diallyldimethylammonium chloride), salts thereof, or copolymers thereof.

9. The coating composition of claim 1, wherein the at least one negatively charged group comprises at least one acid group.

10. The coating composition of claim 1, wherein the at least one negatively charged group comprises at least one carboxylic acid or at least one sulfonic acid.

11. The coating composition of claim 1, wherein the second polymer is polyacrylic acid, polymethacrylic acid, polyitanconic acid, polycifraconic acid, polybenzoic acid, polymeric derivatives of half carboxylic esters of malonates, salts thereof, or copolymers thereof.

12. The coating composition of claim 1, wherein the at least one protecting group is selected independently from phenacyl, o-nitrobenzyl, acetophenones, benzoins, cinnamate esters, coumaryl, or combinations thereof.

13. The coating composition of claim 1, further comprising a solvent.

14. The coating composition of claim 13, wherein the solvent is water, ethanol, methanol, acetone, tetrahydrofuran, ethyl acetate or combinations thereof.

15. The coating composition of claim 1, further comprising one or more pigments, binders, or additives.

16. The coating composition of claim 15, wherein the binders are selected from polyurethanes, polyesters, melamine resins, acrylics, or copolymers thereof.

17. The coating composition of claim 1, wherein the coating composition is hydrophilic when the salt bridge is formed.

18. The coating composition of claim 1, wherein the first polymer and the second polymer are present in the coating composition in a molar ratio of about 0.1:1 to about 10:1.

19. The coating composition of claim 1, wherein the first polymer comprises at least one amine or ammonium group and the second polymer comprises at least one acid group, and wherein the number of the at least one amine or the ammonium groups on the first polymer substantially equals to the number of the at least one acid groups on the second polymer.

20. A method of making a coating composition, the method comprising:
    providing a mixture comprising:
        a first polymer comprising at least one positively charged group,
        a second polymer comprising at least one negatively charged group, and
        at least one protecting group contacting the at least one positively charged group of the first polymer, the at least one negatively charged group of the second polymer, or both, wherein the at least one protecting group is configured to be removed by photo cleavage to form a salt bridge between the at least one positively and at least one negatively charged groups.

21. The method of claim 20, further comprising adding at least one self-cleaning mineral to the mixture.

22. The method of claim 20, further comprising applying the mixture to a substrate at a temperature of about 0° C. to about 100° C.

23. The method of claim 22, further comprising exposing the mixture to photo radiation for a time period sufficient to remove at least a portion of the at least one protecting group to form the salt bridge between the at least one positively and at least one negatively charged groups.

24. The method of claim 23, wherein the photo radiation is in a visible or ultraviolet range.

25. The method of claim 20, wherein the coating composition is hydrophilic when the salt bridge is formed.

26. An article of manufacture, comprising:
    a coating covering at least a portion of the article, wherein the coating comprises:
        a first polymer comprising at least one positively charged group,
        a second polymer comprising at least one negatively charged group, and
        at least one protecting group contacting the at least one positively charged group of the first polymer, the at least one negatively charged group of the second polymer, or both;
    wherein the at least one protecting group is configured to be removed by photo cleavage to form a salt bridge between the at least one positively and at least one negatively charged groups.

27. The article of claim 26, wherein the coating further comprises at least one self-cleaning mineral.

28. The article of claim 26, wherein the at least one self-cleaning mineral is a photocatalytic material.

29. The article of claim 26, wherein the coating is composed to be hydrophilic when the salt bridge is formed.

* * * * *